United States Patent [19]
Funke et al.

[11] 3,915,645
[45] Oct. 28, 1975

[54] CHEMICAL REACTION TRANSDUCERS FOR USE WITH FLUERIC GAS CONCENTRATION SENSING SYSTEMS

[75] Inventors: Maurice F. Funke, Rosslyn, Va.; James F. Bald, Jr., Jersey City, N.J.

[73] Assignee: The United States of America as represented by the Secretary of the Army, Washington, D.C.

[22] Filed: Apr. 24, 1973

[21] Appl. No.: 354,035

[52] U.S. Cl.............. 23/232 R; 23/254 R; 73/23.1
[51] Int. Cl.² ............................................ G01N 29/02
[58] Field of Search .......... 23/232 R, 232 E, 254 R, 23/254 E; 73/194 B, 23.1, 27

[56] References Cited
UNITED STATES PATENTS

| | | | |
|---|---|---|---|
| 2,244,366 | 6/1941 | Jacobson et al. | 23/232 E |
| 2,732,710 | 1/1956 | Richardson | 23/232 E UX |
| 2,888,330 | 5/1969 | Kapff | 23/232 E |
| 3,144,762 | 8/1964 | Testerman et al. | 73/23.1 |
| 3,460,909 | 8/1969 | Gayle | 23/232 E X |
| 3,518,059 | 6/1970 | Levy | 23/254 R X |
| 3,558,279 | 1/1971 | McRae et al. | 23/232 E X |
| 3,558,283 | 1/1971 | Freeman et al. | 23/232 E |

*Primary Examiner*—Robert M. Reese
*Attorney, Agent, or Firm*—Nathan Edelberg; Robert P. Gibson; Saul Elbaum

[57] ABSTRACT

A method and an apparatus for the determination of the presence and relative quantity of a reactive component or components in a gas mixture which is based upon the use of flueric gas concentration sensing systems, which give a signal whose frequency is dependent upon the absolute temperature and composition of the gas mixture, by altering the temperature and/or composition of the gas mixture by the alteration of at least one of the components of the gas mixture. The signal generated by gas as altered by a chemical reaction is compared with the signal generated by the unaltered gas or by another modified gas to indicate the change caused by the alteration of the reacted component, thus indicating the presence and relative quantities of this component.

4 Claims, 3 Drawing Figures

CHEMICAL REACTION TRANSDUCERS FOR USE WITH FLUERIC GAS CONCENTRATION SENSING SYSTEMS

The invention described herein may be manufactured, used, and licensed by or for the United States Government for governmental purposes without the payment to us of any royalty thereon.

BACKGROUND OF THE INVENTION

This invention relates to a highly reliable and accurate method and apparatus for monitoring the presence of a gas component and gas concentration levels in the atmosphere or in controlled environments. Prior art methods and apparatus for determinging the presence of, and the concentrations of components, such as water vapor, carbon dioxide and sulfur dioxide in the atmosphere, have been relatively expensive, complicated, unwieldy and often difficult to operate. In many cases these prior art methods and apparatuses cannot be effectively utilized because of the size of the apparatus required; their inability to give accurate results under conditions wherein there is a danger of vibration or of shock; and limitations with respect to operability over limited temerature ranges, and limited pressure or relative humidity conditions.

OBJECTS OF THE INVENTION

Accordingly, it is a primary object of the present invention to provide a simple method and uncomplicated apparatus which is reliable and which gives a highly accurate measurement of the presence and level of concentration of a selected component or components in a mixture of gases, such as that which is found in the atmosphere or which may be present in a controlled environment.

Another object of this invention is a method and apparatus for determining very small amounts of a reactive gas present in a mixture of gases as well as an accurate reading of the concentration level of said reactive gases.

A further object of the invention is to utilize the reactive abilities of the components of a gas mixture by utilizing other compounds thereby causing a change in the composition and/or temperature of the gas mixture.

An additional object of the present invention is to utilize the reactive abilities of a component or components present in the gas mixture whereby they are caused to react thereby producing a different gas or gases which will result in a change of the flueric signal generated by the gas mixture.

Still another object of this invention is to provide an apparatus which is rugged and compact and which can give a fast and accurate indication of the concentration level of at least one component present in a sample of gas.

A still further object of this invention is the provision of an apparatus which can convert at least one component of a gas mixture into a different compound or which can remove a component from the mixture and can indicate the concentration of this component of the gas mixture by an electrical or acoustical signal.

BRIEF DESCRIPTION OF THE INVENTION

Briefly, in accordance with the present invention, an apparatus is provided for analyzing a gas mixture, comprising a confined zone, a plurality of means for sensing and transducing signals which are the function of the absolute temperature and composition of the mixed gas passing through portions of the confined zone. A means is also provided in combination thereof for treating at least one portion of the gas prior to passing the same through one of the means for sensing and transducing signals, whereby the composition of the gas is altered, and a means for comparing the signals from the plurality of transducing means.

The method is also provided for analyzing a gas sample which comprises flowing a stream of gas sample through a confined zone, sensing the gas and transducing a signal which is a function of the absolute temperature of the gas and the composition of the gas sample. Thereafter, the composition of the gas is altered by modification of at least one component of the gas. Sensing and transducing a signal which is a function of the absolute temperature and composition of the modified gas is then accomplished. The two signals are then compared to determine the relative quantity of the altered component of the gas.

The invention will be better understood and objects other than those set forth above will become apparent after consideration is given to the following detailed description which makes reference to the annexed drawings, presenting preferred and illustrative embodiments of the invention, and wherein.

DETAILED DESCRIPTION OF THE INVENTION

Figure 1:
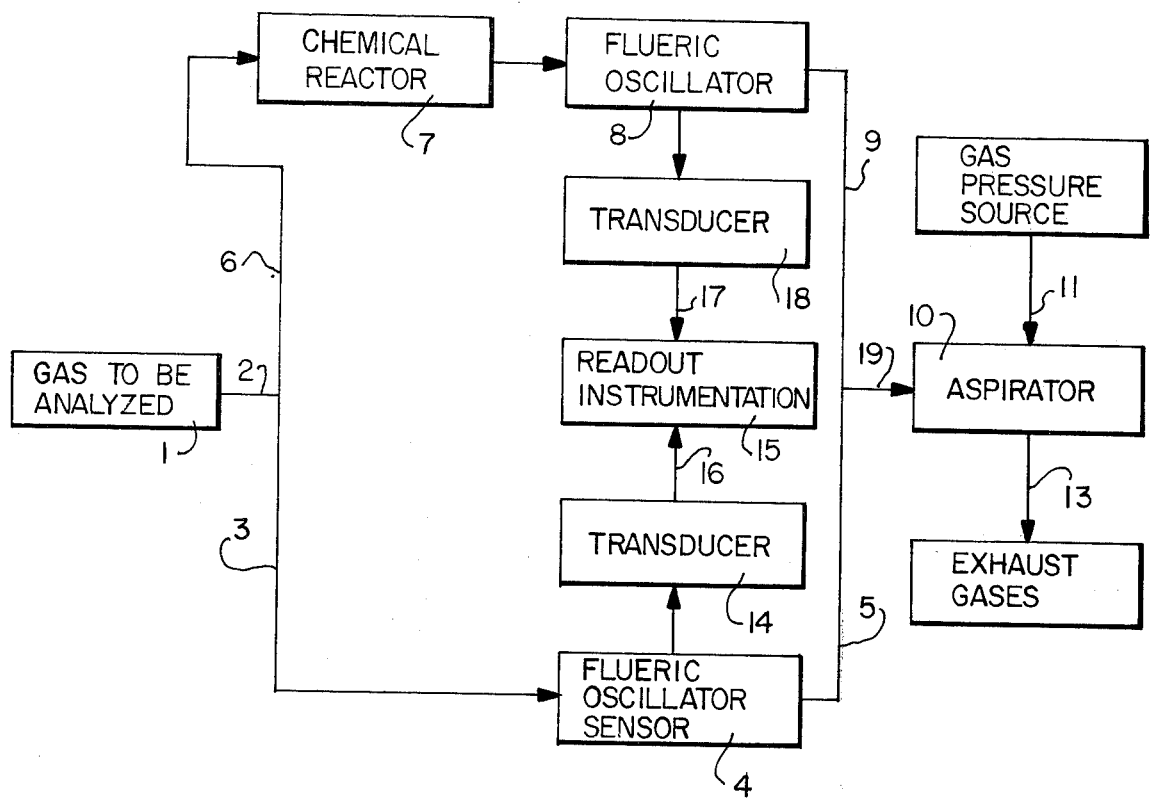
FIG. 1 represents a diagrammatic arrangement of one system employed in the present invention.

The objects of this invention are preferably accomplished by the use of flueric gas jet edge resonator oscillators, such as those which are described in the U.S. Pat. Nos. 3,311,122 and 3,390,692, which describe means for sensing the temperature and composition of the mixture of gases. It is to be understood that other means which serve to transduce the temperature and composition of a gas mixture can be employed without departing from the present invention. The term "flueric" is used to refer to devices and methods which transduce an electric signal from a flowing fluid stream.

The patents noted above describe flueric gas jet edge resonator oscillator sensors which generate a frequency signal based upon the properties of their power supplies. This frequency depends upon the absolute temperature of the gas according to the formula:

$$f(T) \cong f(T_o) \sqrt{\frac{T}{T_o}}$$

wherein:

T is the absolute temperature, and
$f$ is the oscillator signal frequency.

The signal frequency employed in these patents is also a function of the concentration level of a specific gas in the gas mixture and this dependency is indicated by the formula:

$$f_m \cong \left[1 + \phi \left(\frac{f_1}{f_2} - 1\right)\right] f_2$$

wherein:
- φ = volume fraction of the No. 1 gas in the gas mixture,
- m refers to a gas mixture composed of two or more gases
- 1 referes to the specific gas being sensed in the mixture and
- 2 refers to carrier gas or gases in the gas mixture.

The present invention is based upon the concept that, by varying either the temperature of the gas mixture or the composition of the gas by the reaction of one of the specific gases therein, the frequency of the signal transduced by flowing the gas through a flueric gas sensor as shown in the above-identified patents will be altered and the new signal can be compared with the signal transduced by the original or unaltered mixture or by another altered gas mixture to give a determination of the amount of gas present in the original mixture.

It is desirable to modify the component to be analyzed by the utilization of a reaction which will vary both the composition of the gas and the temperature of the gas mixture. It is prefered to utilize those reactions wherein the temperature and composition changes will result in a change in the frequency of the signal., i.e., that both will cause an increase or decrease in the frequency of the signal. It is possible to treat the component of the gas by a reaction wherein only the composition is changed, but it is desirable to utilize those reactions wherein both temperature and composition changes occur.

It is also desirable to use a reaction which will result in the production of another gas which will favorably alter the signal generated in the transducer.

While it is highly desirable to utilize a reaction which will generate a different gas that can be sensed in the transducer, another embodiment of this invention involves the reaction of the gas component so that it is converted into a solid or liquid and then removed from the gas mixture. While the reaction is referred to as a chemical reaction, it is not necessary for the operation to actually result in the formation of a different compound, but may include one in which the component is absorbed or adsorbed, without departing from the concept of the present invention. Regardless of the nature of the reaction, it is preferred that the material employed to be reacted with the desired component of the gas mixture to be one which will react quickly with the gas component.

It is highly desirable that the material to be reacted with a component of the gas mixture to be either a solid or act like a solid so that when a liquid is absorbed upon or within a solid material, the apparatus can be used in any physical orientation. However, where the apparatus is to be in a permanent locationm it will be equally feasible to react the gas with a liquid.

Referring now more specifically to the drawings, and in particular FIG. 1, the source of the gas 1 to be analyzed is caused to flow through a confined zone which includes a passageway 2 for the gas. One desirable way of inducing the flow is by means of an aspirator 10 connected to the exhaust passage 19 of the confined zone.

The passageway 2 of the confined zone may have a single path or may be divided into two separate flow paths 3 and 6, as illustrated in FIG. 1. The gas flow is then divided and half of the gas which remains in an unaltered form flows through the passageway 3 through a flueric sensor 4, e.g., a flueric gas concentration sensing system oscillator sensor which can be constructed in accordance with the teachings contained in U.S. Pat. Nos. 3,311,122 and 3,390,692.

The gas mixture flowing through the sensor can be arranged in series, in the event a single path in the passageway is employed, or in a parallel relationship, in the event the passageway utilizes a path having two branches. Any combination of parallel or series arrangement of sensors may be employed if more than two sensors are employed.

When the sensors exist in a parallel relationship, as illustrated in FIG. 1, the other half of the gas flows first through passageway 6 to the chemical reactor 7 just prior to flowing into at least one sensor. This reactor can be constructed in the manner illustrated in FIG. 2, which will be discussed in greater detail hereinafter. After the gas is modified during passage through chemical reactor 7, the gas is conducted through the passageway to the flueric oscillator sensor 8. Transducers 14 and 18 are connected to sensors 4 and 8, respectively. The transducer 18 receives a signal from sensor 8 due to the reacted or altered gas which is of a different frequency from the signal given by the unaltered gas passing through sensor 4, or by a gas modified by another and different reaction. The different signals from transducers 14 and 18 are fed through lines 16 and 17 to the read out instrument 15. This instrument is responsive to the differences in frequency of the two signals and indicates the difference in frequency. According to one embodiment of the invention, it is possible to calibrate the readout instrument 15 whereby the component of the gas being measured quantitatively can be read in terms of the number of parts per million that are present in the sample being tested.

Thus it is readily apparent that if the transducers give an electrical signal, the frequency can be compared by well-known electrical means and a resultant signal given. If the transducers employed give an audible signal, the difference in frequency or pitch can be compared in a well-known manner.

The chemical reaction taking place in ractor 7 can be exothermic, that is, a reaction which will generate heat, as well as creating different compounds in the composition of the gas mixture. One of the most desirable reactions for the practice of this invention, is the use of alkali metal hydrides for the determination of the presence of water vapor in a given gaseous composition, e.g., air. The preferred primary reactant is lithium aluminum hydride, which reacts with water vapor as follows:

$$LiAlH_4 + 4H_2O \rightarrow LiOH + Al(OH)_3 + 4H_2 + 166.1 \text{ kcal.}$$

Thus when lithium aluminum hydride is employed, the temperature is increased to an amount that will give a signal increase of 0.97 Hz for each p.p.m. of water vapor present in the mixture which changes according to the formula:

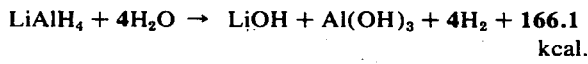
$$f(T) = f(T_o \sqrt{\frac{T}{T_o}}$$

The reaction produces for each molecule of water reacted, one molecule of $H_2$ and according to the formula $$f_m\left[=1+\phi\left(\frac{f_1}{f_2}-1\right)\right]f_2$$

each p.p.m. of hydrogen gas produced will increase the signal frequency by 0.28 Hz. Thus, the use of lithium aluminum hydride as the primary reactant in ractor 7 will result in a total change in signal frequency of 1.25 Hz for each part per million of water vapor reacted. It is clear that this change in frequency will result in the detection of very small changes in the amount of water vapor originally present in a sample of gas being tested.

Other alkali metazl hydrides, such as sodium hydride and calcium hydride, can be equally reacted with water vapor according to the formulae:

and

While the heat produced by these reactants is less than that which is obtained from the use of lithium aluminum hydride, these reactants are useful in the practice of this embodiment of the invention. Other solids reacting with water vapor, e.g., calcium oxide, can also be employed.

The reaction of the primary reactant and the water vapor can also be endothermic, such as the reaction of titanium tetrabromide with water vapor to produce hydrogen bromide according to the formula:

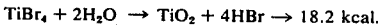

In this reaction, the signal frequency is decreased due to a reduction in temperature and due to the formation of hydrogen bromide, which is heavier than air and water vapor.

Since the reaction of water vapor with different reactants can produce either an incrase or a decrease in the frequency of the signal transduced, a combination process employing two reactants can give a system which is extremely sensitive to small changes in the amount of water vapor in a sample of a gas mixture. This embodiment of the invention comprises dividing the air stream into two separate branches and flowing the air in one branch through a reaction chamber containing a primary reactant which reacts exothermically and will produce a lighter gas and then flowing the reacted gas to a sensor which will give a signal of higher frequency, and flowing the air in the other branch through a reaction chamber containing a primary reactant that reacts with the vapor endothermically, producing a heavier gas, and then flowing the reacted gas to another sensor whichgives a signal of a lower frequency than that given by the other gas stream. This combination process sill enable one to obtain a wider difference in frequency than can be obtained when only a single reactant is being employed, when measuring the water vapor content of a sample of gas.

Other components in an air or gas sample, such as carbon monoxide and the sulfur oxides can be reacted with suitable primary reactants in a similar manner. In the case of a reducing gas, such as carbon monoxide, the primary reactant can be a solid with a high state of oxidation.

Once the gas streams have passed through the sensors, portions 5 and 9 of the passageway conduct the air or gas sample being tested to a common passageway 19 where the two gas streams are mixed and then drawn to aspirator 10. Aspirator 10 is actuated by a flow of gas from the gas pressure source 11 and is discharged into the atmosphere or a suitable container through passageway 13.

Figure 2:
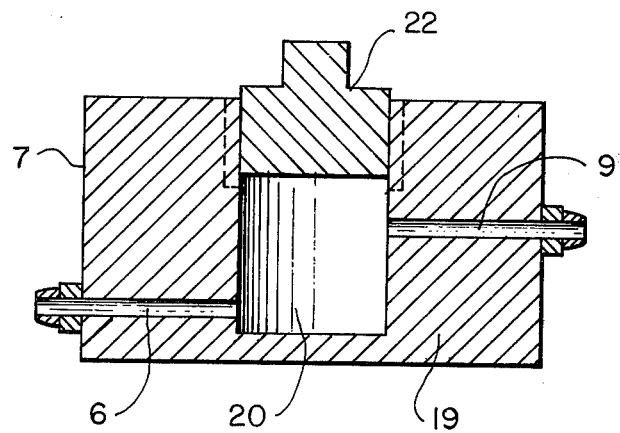
FIG. 2 represents a specific form of the reaction chamber and is in cross section through the chamber.

FIG. 2 illustrates a preferred form of the chemical reactor 7 which constitutes a portion of the confined zone. In this drawing, portion 6 of the passageway constitutes the entry for gas into the reactor from the source. The reactor comprises body 19 having a chamber 20 which is a size sufficient to contain a quantity of the primary reactant. The chamber also includes portion 9 of the passageway that leads to the flueric oscillator sensor 8. The body has an opening to the exterior which is closed by plug 22. This plug can be removed to allow the primary reactant to be placed in, and removed from, chamber 20. The reactant is preferably solid and granular and coarse enough to allow free flow of gas through the chamber. It will be frequently desirable to have the reactant material in a perforated bucket which can be readily removed from the chamber. In installations wherein large quantities of the reactant are employed, separate openings can be provided at the top and bottom of the chamber for supplying and removing the reactant. The openings may be operated either continuously or intermittently.

Figure 3:
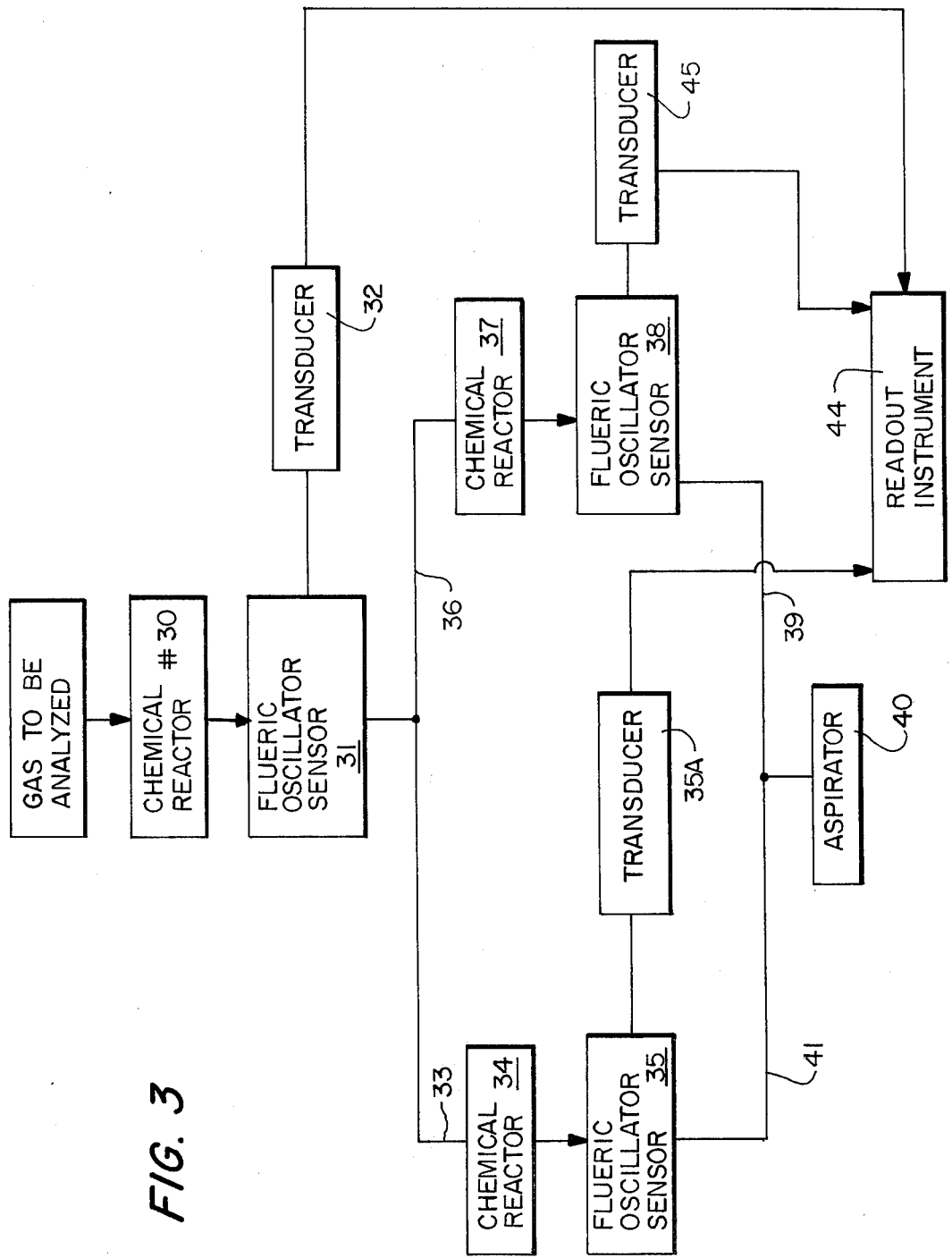
FIG. 3 represents a diagrammatic arrangement of a modification of the system.

FIG. 3 represents a modification of the system shown in FIG. 1. In this modification a chemical reactor 30 and a flueric oscillator sensor 31 and its corresponding transducer 32 are in the confined zone and passageway, preceding the division of the passageway into the branches 33 and 36. Branch 33 of the passageway feeds a portion of the gas into the chemical reactor 34 and then to the flueric oscillator sensor 35 with its corresponding transducer 35A and then feeds the gas through 41 to the aspirator 40. The second branch 36 of the passageway feeds the gas into the chemical reactor 37 and then to the flueric oscillator sensor 38 and through the branch 39 to aspirator 40.

The transducers 32, 35A and 45 are connected to supply their frequency signal to the readout instrument 44.

Tis modification of the system permits the operation of the system in several distinct manners. For instance, if the chemical reactors 30 and 34 are left empty, the system will operate in the same manner as the system illustrated in FIG. 1. If the reactor 30 is left empty and the reactors 34 and 37 are filled with different primary reactants which react with a component, such as water vapor, in the opposite manner, as for example by filling reactor 37 with lithium aluminum hydride and by filling reactor 34 with titanium tetrabromide, the water vapor upon reacting, will change the frequency of the signal of the corresponding transducers in the opposite manner. As shown above, the reaction of the lithium aluminum hydride will result in an increase in the frequency of the signal and the reaction of titanium tetrabromide will reduce the frequency of the signal. Thus, the first oscillator sensor 31 and the transducer 32 will give a signal having the value of the unaltered gas and the other oscillators and transducers will give very sensitive readings, for example, of the water vapor content.

Other modifications are possible with this system, for example, the first reactor in series may be used to remove one component, such as water vapor from the system, and the other reactors filled with materials which will react with other components, e.g., carbon monoxide or sulfur oxides.

Similarly, it may be difficult to find a prime reactant which reacts with only the gas to be sensed in the gas mixture. In this case, the first reactor could react with more than one component gas of the gas mixture, producing several different products of reaction. The products of the reaction of the gas to be sensed would then react with other reactors to produce the required changes in the composition and/or temperature of the gas mixture.

While the preferred form of the reactor is designed to use a granular solid primary reactant, it is possible to use liquid reactants. In this event, the chamber 20 may be filled with material which will act in the manner of a sponge to hold the liquid, such as sand or fibrous material and the liquid primary reactant coated on the material. The liquid can be stationary or may be allowed to flow through the material in the chamber.

When the atmosphere gas sample to be analyzed contains a pollutant which is suspended in the gas, such as dust particles or liquid droplets, one of the chemical reactors may be filled with material which will act to filter these particles from the gas. The sensor can be operated to give a signal based upon the gas without filtering and with filtering. Similarly, the particles or droplets could be made to chemically react, causing the composition or temperature of the gas mixture to be altered.

The specific form of transducers and sensors shown in U.S. Pat. Nos. 3,311,122 and 3,390,692 are not the essense of this invention, but other forms of transducers and sensors which are based upon the absolute temperature and/or any other properties, molecular weight or viscosity, of the composition can be used to detect changes in temperature and composition of the gas passing through the chemical reactor.

We wish it to be understood that we do not wish to be limited to the exact details of construction shown and described, for obvious modifications can be made by a person skilled in the art.

Accordingly, what is claimed is:

1. A method of analyzing a mixed gas which comprises dividing a stream of the mixed gas into two portions, flowing a first portion of the gas through a confined zone, altering the composition of the first portion by chemically reacting exothermically at least one component of the mixed gas, sensing the altered gas and transducing a signal having a frequency which is a function of the absolute temperature and composition, flowing a second portion of the gas through a confined zone, altering the composition of the second portion by chemically reacting endothermically at least one component of the mixed gas, sensing the altered second portion and tranducing a signal having a frequency which is a function of the absolute temperature and composition, and comparing the frequencies of the two signals to indicate the relative quantity of the altered component in the mixed gas, in which the confined zones include gas jet edge resonator oscillator sensors.

2. The method of claim 1 wherein the mixed gas is divided into three portions, flowing a third portion of the mixed gas through a confined zone and transducing a signal which is a function of the absolute temperature and composition of the mixed gas, and comparing this signal with the signals from the first and second portions.

3. An apparatus for analyzing a mixed gas comprising two confined zones, means for inducing a flow of said mixed gas through the confined zones, gas jet edge oscillator means in each confined zone for sensing and transducing a signal having a frequency which is a function of the absolute temperature and composition of the mixed gas passing through said confined zones, means for chemically reacting exothermically a first portion of the mixed gas prior to passing through one of said confined zones, to alter the composition, means for chemically reacting endothermically a second portion of the mixed gas prior to passing through a second confined zone, to alter the composition, and means for comparing the frequencies of the signals from the transducing means.

4. Apparatus according to claim 3, comprising three confined zones, wherein two zones include said means to alter the composition and temperature of the gas passing through the zone before reaching the sensors and transducers and wherein the third zone includes jet edge oscillator means to sense the mixed gas, and means for comparing the frequency of the third oscillator means with those of the first and second oscillators means.

* * * * *